Oct. 1, 1935.  H. G. PRESSENTIN  2,016,048
WHEEL CONSTRUCTION
Filed Oct. 29, 1934   2 Sheets-Sheet 1

Inventor
Herbert G. Pressentin
By Clarence A. O'Brien
Attorney

Oct. 1, 1935.  H. G. PRESSENTIN  2,016,048
WHEEL CONSTRUCTION
Filed Oct. 29, 1934   2 Sheets-Sheet 2
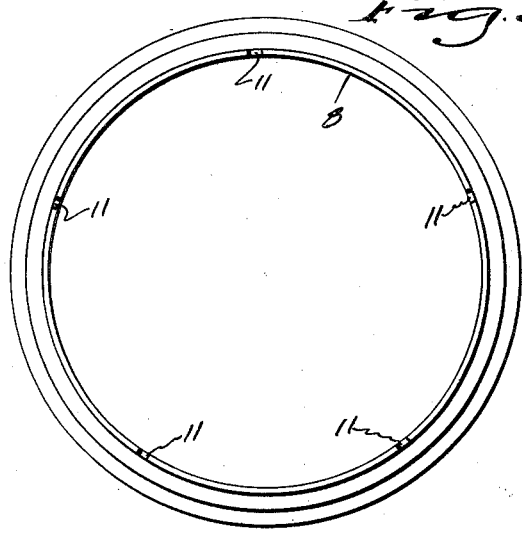
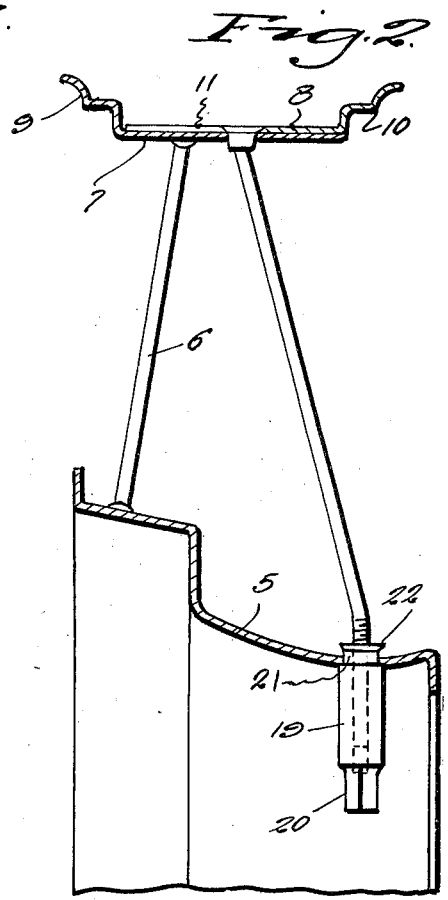
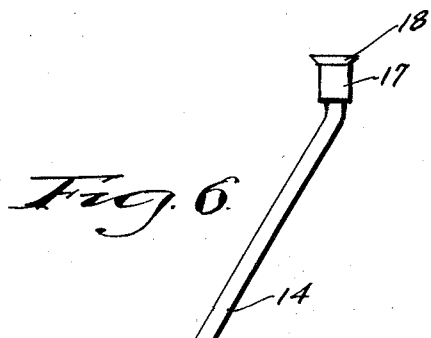
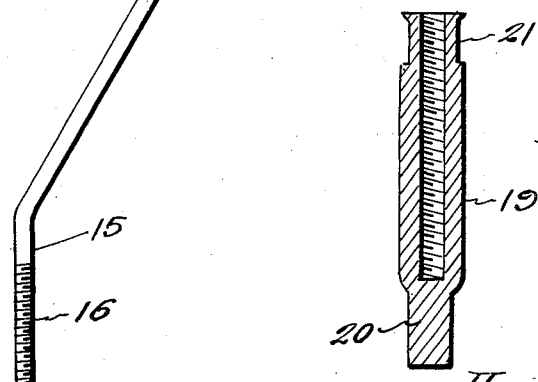
Inventor
Herbert G. Pressentin
By Clarence A. O'Brien
Attorney Patented Oct. 1, 1935

2,016,048

UNITED STATES PATENT OFFICE 2,016,048

WHEEL CONSTRUCTION

Herbert George Pressentin, Madison, Wis.

Application October 29, 1934, Serial No. 750,576

1 Claim. (Cl. 301—59)

The present invention relates to a wheel construction and particularly to that type using wire spokes, and the prime object of the invention resides in the provision of a wheel of this nature from which a tire may be quickly and easily demounted and just as easily mounted.

Another important object of the invention resides in the provision of a wheel construction of this nature which is simple, comparatively inexpensive to manufacture, simple and speedy to manipulate, thoroughly efficient and reliable in use, strong and durable and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 2 is a sectional view therethrough taken substantially on the line 2—2 of Figure 1, Figure 3 is a side elevation of the removable rim section.

Figure 6 is a perspective view of one of the locking spokes, and

Figure 7 is a longitudinal section through one of the nut or lug elements.

Figure 1:
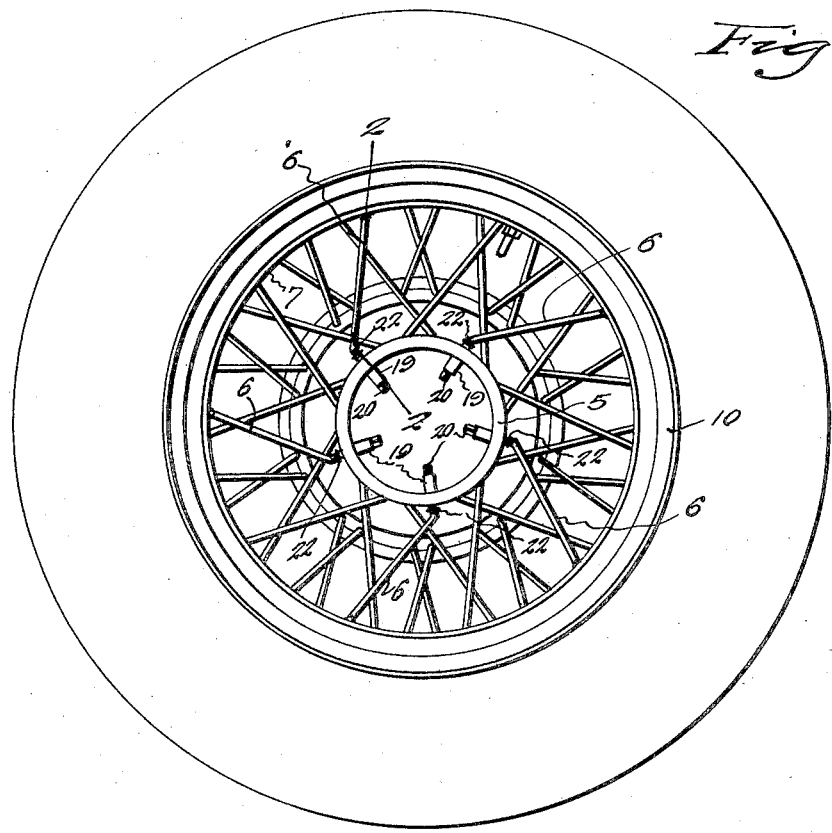
Figure 1 is a side elevation of a wheel embodying the features of my invention.
Figure 4:
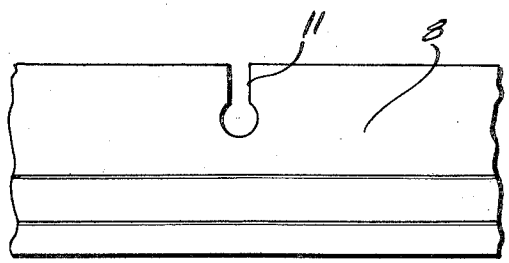
Figure 4 is a fragmentary plan view of the removable rim section.
Figure 5:
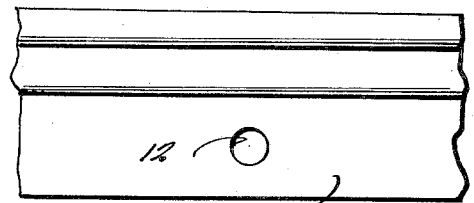
Figure 5 is a fragmentary plan view of the fixed rim section.

Referring to the drawings in detail it will be seen that the numeral 5 denotes a hub, from a portion of which radiates fixed spokes 6 fixed to rim section 7 over which is telescopable a rim section 8. Rim section 7 is provided with flange 9 and the rim section 8 is provided with a flange 10, the flange 9 would be located inwardly with respect to the vehicle and the flange 10 outwardly with respect thereto. The removable rim section is provided with key hole notches 11 extending inwardly from the outer edges thereof. The rim section 7 is provided with openings 12 adapted to register with the notches when the rim sections are in closed position. A plurality of spokes 14 are provided with ends parallel to each other and oblique to the spokes. One end of each spoke 14 is denoted by numeral 15 and is threaded as at 16. The other end is in the form of a head 17 slidable in one of the openings 12 and having an outwardly directed annular stop shoulder 18 on the upper end thereof. Numeral 19 denotes elongated nut or lug bodies internally threaded. The inner ends are extended and solid and non-circular in formation and denoted by numeral 20 so that a tool may be easily engaged therewith. The upper ends are reduced as at 21 and are rotatable in openings in the hub 5 and are provided at their upper edges with outwardly directed stop shoulders 22. The threaded ends 16 are receivable in these nuts.

By inserting an implement in the hub the nuts or lugs may be loosened one at a time until all five lugs have been loosened and thus to permit the removal of the sliding rim 8. After removing the rim the lugs should be tightened so that the tire can be removed. In order to replace the tire, reverse the operation, that is put the tire on the rim with the spokes, loosen the lugs, slip on the rim, and then tighten the lugs. If desired, a suitable relatively small keylike implement may be used for operating the lugs.

It is thought that the construction, operation, utility and advantages of this invention will be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a wheel structure of the class described, a rim formed in two inter-fitting sections, the outer section having a plurality of key hole notches extending from the inner edge thereof, the other section having a plurality of openings in registry with said notches, a plurality of heads in said openings and notches and having stop flanges on the outer ends thereof, a hub, spokes fixed to the hub and to the inner rim section, spokes fixed to the heads and extending inwardly therefrom, lugs rotatably mounted in the hub and having threaded engagement with the inner ends of the last mentioned spokes, each lug including an elongated internally threaded hollow body having its inner end solid and non-circular in formation and its outer end reduced to be rotatably mounted in an opening in the hub and at its outermost extremity an annular stop shoulder.

HERBERT GEORGE PRESSENTIN.